Patented June 14, 1927.

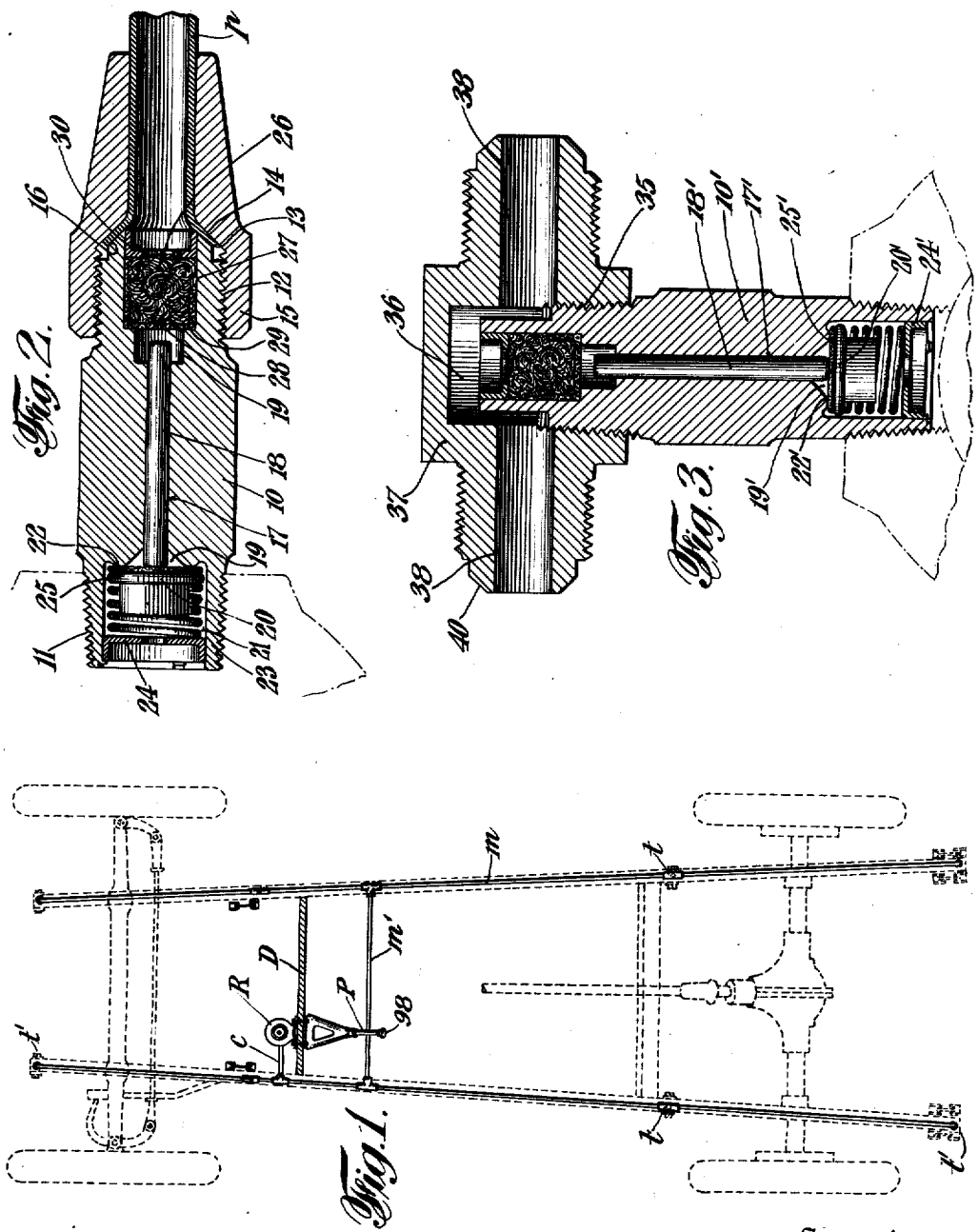

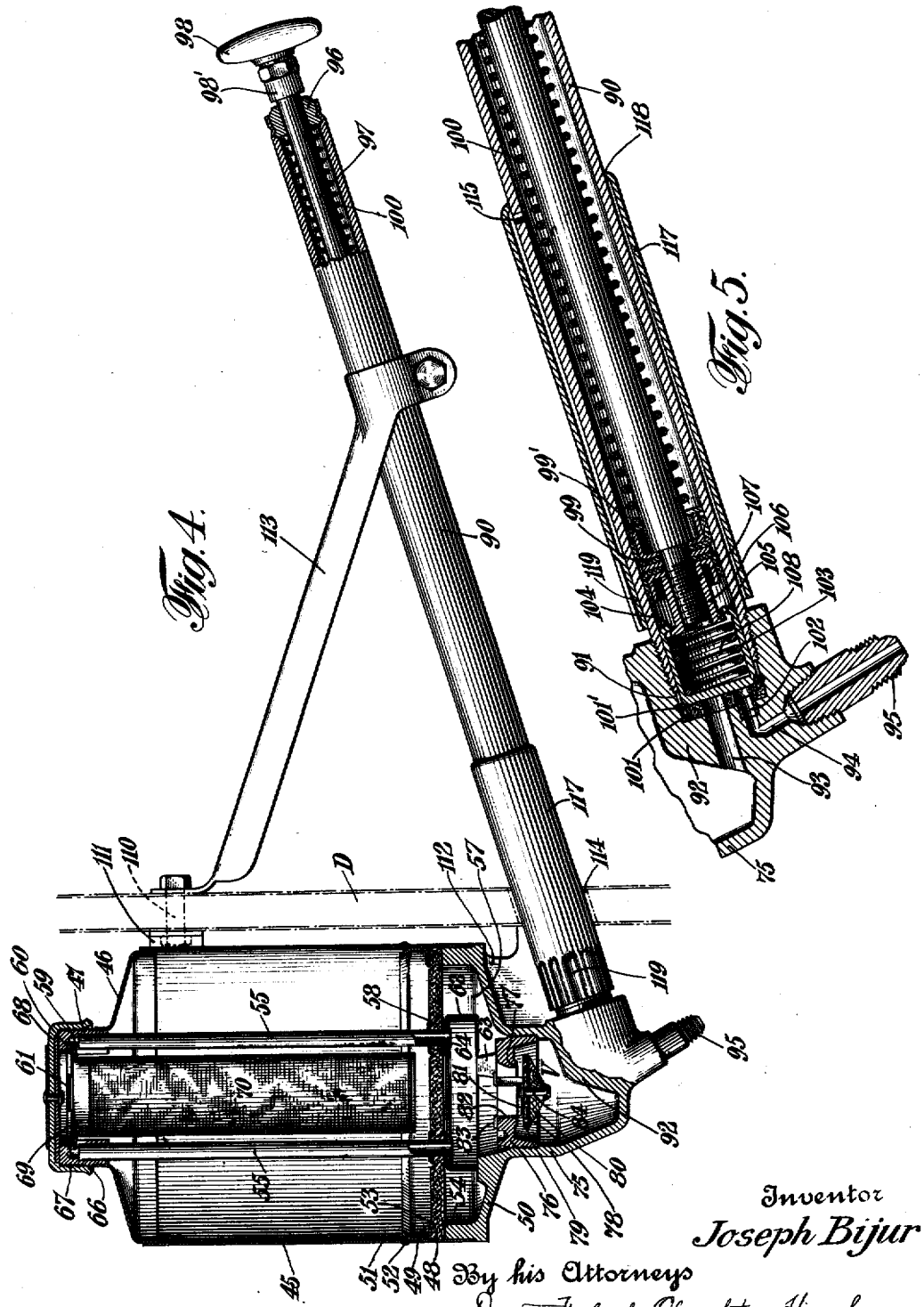

1,632,771

UNITED STATES PATENT OFFICE.

JOSEPH BIJUR, OF NEW YORK, N. Y., ASSIGNOR TO AUTO RESEARCH CORPORATION, A CORPORATION OF DELAWARE.

LUBRICATING INSTALLATION.

Application filed July 24, 1926. Serial No. 124,566.

My present invention relates broadly to remote-control fluid distribution and is concerned in certain preferred applications with systems and installations for lubricating a plurality of distributed bearings on a machine, a group of machines or mechanical installations generally, from a readily accessible point of control.

The invention relates especially to lubricating installations of the type in which lubricant under pressure is transmitted from a pressure source, such as a pump, through a system of lubricant-filled piping, concurrently to various distributed outlets therefrom, which communicate with the bearings. The invention is shown exemplified in a preferred application to the lubrication of all or most of the bearings on the chassis of a vehicle, such as an automobile or a motor truck.

It is an object of the invention to provide a system of the above type, which shall be easily operable, to reliably deliver predetermined charges or predetermined percentages of a charge of oil from a reservoir, simultaneously to a multiplicity of distributed bearings and in accordance with the different requirements thereof, all by a single simple non-selective operation.

Another object is to provide a system of the above type devoid of oil cups, grease cups, sight feed devices, or other bulky fittings, the operation of which is not dependent on the tightness of the bearings, and which functions with uniform reliability regardless whether the bearings or some of them are at level lower or higher than that of the source of lubricant or pressure, and in which the relative rates of emission to the various bearings are correctly predetermined and maintained invariant throughout use, without the need for any adjusting operation whatsoever, either initially or after service.

Another object is to provide a system of the type mentioned, in which the control devices for the various bearings do not have to be disposed in any definite relation with respect to the vertical, in order to reliably determine the division of lubricant, and in which there is no necessity for allowing for differences in the lengths of pipe branches or for diversities in level or in the tightness or looseness of the bearings.

Another object is to provide an installation of the character set forth in which the proper distribution of oil to all bearings is effected regardless, whether the oil be relatively fluid at high temperatures or relatively viscous at low temperatures, thereby rendering feasible the use of one and the same grade of viscous oil under all ordinary ranges of temperature between winter and summer.

Another object is to provide a system of the above type, in which oil flow with high line pressure is produced as the result of work manually performed with little effort, though the oil be of high viscosity, and in which increase in viscosity of the oil does not entail a corresponding increase of physical effort on the part of the operator.

Another object is to provide a system of the above type, which requires little or no care to maintain it in operative condition and which more particularly will pass oil to distributed bearings without the need for any cleaning, air bleeding or other manual operation at any of the control devices that determine the division of lubricant for the bearings.

Another object is to provide a system of the type mentioned devoid of any moving mechanism beyond the pump, which requires a minimum length of but a single gauge of pipe, that may be of bore so small as to have sufficient flexibility to permit ease of installation thereof upon the vehicle.

Another object is to provide a system of the type mentioned in which the flow of lubricant is unimpeded until it reaches the flow control devices which ordinarily may be disposed directly at the bearings where lubricant is accordingly delivered promptly after application of pressure at the source, so that an empty chassis line may be speedily filled and the appearance of oil at each bearing promptly noted.

Another object is to provide a system of the above type dispensing with the need for tail pipes or other voids beyond the flow control devices, which would have to be filled before oil could reach the bearings, and thus avoiding consequent irregularities not immediately apparent, in the oiling of the bearings.

Another object is to provide an installation, the operation of which will not be impaired by any scale or chips within the pipes entrained by the oil in its flow toward the bearings.

Another object is to provide a system of the foregoing type, normally maintained so tight as not to drip or waste oil in the intervals between operations, at the central source of pressure and more particularly one in which this result is obtained even though some one part of the pipe system be loose or relatively open.

Another object is to provide a system of the type mentioned in which a defect in the operation of any of the flow control outlets to the bearings can be remedied by the simple process of removing the defective or improperly rated fitting and substituting therefor, one suitable for the bearing, and in which said flow controlling fittings are disposed at places where they are readily accessible for such replacement.

Another object is to provide a system of the type mentioned in which the mere closure of a break in the pipe line will restore to substantially normal operativeness the part of the system ahead of the break and in which a damaged length of pipe can be easily replaced without the likelihood of draining the oil from the system and without the need for any special manipulation, or for over-oiling the chassis in the process of restoring the system to operativeness.

Another object is to provide a lubricating system which without special flow limiting devices, gauges or the like, will inherently indicate a break in the line or a lack of lubricant in the reservoir.

Another object is to provide a system of the type mentioned in which even if the pump or other pressure source should be operated one or more times with little or no lubricant therein, the subsequent operation after it has been replenished shall nevertheless be as regular and as satisfactory as at the outset.

In a preferred system for carrying out the above and other objects, the lubricant is forced through metal pipes of small diameter, each bearing being supplied from a tap at a corresponding part of the pipe line by pressure applied at one point of control, as from a pump. Each line is normally kept filled as by sealing means, preferably relief valves at or near the bearings, normally closed to prevent the entry of air or the escape of lubricant, but permitting emission when a predetermined pressure is exceeded.

To avoid exacting requirements of manufacture in the relief valve springs, which should preferably be made little stronger than the minimum required to assure reliable seating thereof, a variation of one or two pounds each way from the main strength thereof should be allowed.

Such irregularities in the seating pressures of relief valves, however, and diversities in the distribution and in the level thereof, might result in relief of pressure at a valve having a weaker spring, particularly if such valve should be near the source of pressure, or at a low level, so that the corresponding bearing would receive an excess of oil at the expense of other bearings, some of which might receive too little oil.

To obviate such faulty operation, there is interposed according to my invention, in the path of the flow to each bearing, preferably in the vicinity thereof, a flow resistance, preferably a highly restricted outlet, said outlets in multiple substantially sustaining the pressure transmitted from the pump.

The flow resistances are preferably constructed to impose an opposition to flow so great relative to that in the rest of the course of oil flow that they substantially determine and control the distribution as to outlets having the larger part as well as to outlets having little of the flow resistance between the pressure source and the corresponding bearing. Preferably the flow resistances are inaccessible for adjustment, and are fixed or invariant in their retarding effect. Such restricted outlets when applied in a lubricating installation, which delivers to the bearings much more lubricant than the volume of the conduit system, would operate satisfactorily even if the pipe system were devoid of relief valves and were allowed to drain after each operation. However, in chassis lubricating applications, and in analogous relations, where each bearing is to receive but little lubricant at each pressure operation, and where such operations are intermittent or from time to time, it is important that the pressure build up promptly at the beginning of each operation and throughout the entire conduit system, even to the outlets having the greater part of the line resistance interposed between them and the source, for otherwise most or all of the lubricant intended at any operation to be distributed through the various outlets, might be emitted through those outlets nearest the pressure source before the pressure could build up to the more remote outlets in the pipe line. The relief valves maintain the pipe line filled with oil at all times from the pump to the restriction outlets. Thus, the pressure is rapidly transmitted from the pump through the incompressible column of oil filling the pipe, all of the outlets on the line emitting at the desired rate shortly after initiation of pressure.

A desirable type of restriction outlet, preferred in many applications, is of metal affording a minute crevice for the passage of the oil from the line. A satisfactory element includes a small-bore tube nearly filled with a pin or wire, a few thousandths of an inch smaller in diameter, providing a minute crevice, annular in cross-section, through which the oil passes slowly to the bearing when sufficient pressure is applied. The restriction outlet and the associated relief valve are preferably located in the interior of a pipe fitting, which I call a "drip plug," which may be screwed into a part to be lubricated.

Where, as in the present case, the lubricant passes through restrictions near the delivery ends of the line, affording but minute or crevice outlets, it will be seen that in the course of time, the accumulation at or in the obstructions of fine particles of dirt, chips or scale carried with the oil might plug one or more of said drip plugs, and interfere with or even entirely arrest the flow of oil therethrough. Moreover, in any system embodying relief valves, with or without my restricted outlets, the lodging at a valve seat, of a chip or a small particle of dirt or scale carried with the oil, for instance, might prevent the relief valve from seating properly, so that oil would leak from the line even when no pressure is applied. I have, accordingly, provided means for intercepting such foreign bodies before they can reach the restriction or the valve. This means may comprise strainer plugs of felt, located in the drip plugs in advance of the relief valves and the restriction outlets. The resistance to flow of each of said strainer plugs while substantial, is small compared to that of the restriction outlets. Even though clean oil be admitted to the system, the strainer plugs are desirable to intercept any metal chips that pass into the pipe in making up connections, as well as any scale cracked off from the interior of the pipe wall. To guard against the entry to the system of dirt or dust carried with the oil, which might soon clog the small strainer plugs, a fine filter is preferably associated with the source of lubricant.

The pressure transmitted from the source is opposed at each drip plug by the pressure due to the relief valve spring, so that the net pressure available for propelling lubricant through each drip plug restriction is that applied to the length of the line less that opposed by the corresponding relief valve spring. It is desirable to employ relief valves of a character that will seat reliably under a minimum seating pressure, in order to avoid the need for excessively high pump or line pressure. With the use of a valve facing of oil-silk or varnished silk, relief valves, if kept free from solid particles, are found to seat reliably though the seating springs exert a pressure of but a few pounds. However, even weak relief springs will have disparities in seating pressures of one or two pounds due to manufacturing tolerances. Were the pressure of lubricant applied at the pipe line but little greater, say less than double that opposed by the relief valve springs, the relative rates of the drip plugs would be materially affected even by such small variations in the relief valve seating springs.

When a high initial pressure like 30 to 60 pounds is applied to a line, equipped with weak valve springs, say of not more than 15 pounds seating pressure, the drip plugs will, however, be a determining factor in the flow to each bearing, substantially regardless of diversities in the distribution or in the respective levels of the drip plugs, or in the tightness or looseness of the corresponding bearings, or of variations in the resistances imposed by the strainer plugs, or of variations in the seating pressures of the valves. The valves would open substantially concurrently as the high pressure would rapidly build up in the pipe line, and the drip plug restrictions would determine the flow.

To assure reliable distribution particularly in a system of the type mentioned. where but a small quantity of lubricant is forced to the bearings at will, it is, therefore, desirable to apply the high pressure to the line initially at each operation and to substantially maintain it during operation. A spring discharged pump would be suitable for this purpose, provided too much of the energy is not wasted within the pump, and provided the pressure transmitting agency intervening between the pump and the outlets is substantially incompressible at all times. Only in this case would the discharge pressure of the pump promptly raise the line pressure to maximum, for concurrent opening of all the valves and for correct distribution through the drip plugs of a lubricant charge equal to that forced into the line by the pump. The discharge pressure of the pump is preferably such as to cause but drop by drop emission or seepage through the drip plugs. The pump piston would, accordingly, settle slowly as lubricant is slowly forced through the drip plugs. Rapid settling of the piston would be a dependable signal, showing either that the oil reservoir was empty or that the line was fractured or broken, the latter condition becoming evident from a small pool of oil under the break.

The drip plug fittings, each of which preferably includes a valve, a metering pin and a felt strainer, determine the rate of exit of oil to the bearings under operating pressure, and offer a resistance to flow higher than in the rest of the pipe line. The metering pin in each drip plug determines a crevice so minute as to be in itself largely controlling of the resistance to flow imposed by the drip plug. The rating of any drip plug thus depends merely on the diameter of metering pin employed, using uniform bores, the smaller the pin the faster the rate, but the pin of even the fastest flowing drip plug determines a resistance to flow high relative to that of the strainer felt, of the valve, of the pipe line and of the bearing.

According to my invention, means is provided to function when the pump or pressure generator is operated in the absence of lubricant, to prevent the introduction of air into the line, and preferably by relieving, venting or expelling from the system through a course other than through the outlets which lead to the bearings, any air in the range of operation of the pump, said air-relieving or venting means being constructed and arranged to sustain pressure applied thereat through the more viscous lubricant. My installation operates selectively, to vent air and to transmit pressure through lubricant.

The air exclusion device in one embodiment is a valve near the head of the line and held closed by the pressure exerted upon the lubricant during the pump discharge to insure transmission of lubricant pressure through the pipe system, said valve remaining in its normal unseated position until any air beyond it, has been ejected therethrough.

The entire length of the piping system from the pump to the various drip plugs, including that of any junction or outlet fittings therein, is of small diameter bore, that is, of bore too small to permit lubricant to pass around any air therein. It follows that when the new system is originally charged with oil or when an injured length of pipe is replaced, oil injected from the pump will push the air out of the system, as it advances through the pipe line. Slow descent of the pump plunger indicates that all air has been expelled.

Because of the high resistance of the drip plugs, the rate of flow through the conduits is very slow, hence the use of the small bore piping desirable to preclude air trapping is feasible to convey the oil, without thereby involving objectionable loss of head. Such piping is, moreover, inexpensive and can easily be formed to follow around obstructions and to provide flexibility where required in order to accommodate angular or longitudinal motion.

This application is a continuation in part of my copending applications Serial No. 580,668 filed August 9, 1922, and Serial No. 695,740 filed February 28, 1924.

In the accompanying drawings in which is shown one of various possible embodiments of the several features of my invention, Fig. 1 is a diagrammatic plan view of an automobile equipped with my installation, Fig. 2 is an enlarged view in longitudinal cross-section of a drip plug, Fig. 3 is a view similar to Fig. 2 of a T drip plug, Fig. 4 is a side view partly in longitudinal section of a pump reservoir assembly, and, Fig. 5 is a fragmentary sectional view on a larger scale of the pump and its mount.

In Fig. 1 is shown diagrammatically the chassis of an automobile equipped with a lubricant supply unit, illustratively, on the dashboard D and comprising an oil reservoir R with an associated pump P, to the outlet of which is connected pipe $c$, which leads to one of two mains $m$ extending the length of the channel frames and in communication with each other through a cross-pipe $m'$. Branches or taps $t$, a few only of which are indicated, lead from the mains to the various chassis bearings to be lubricated, such as the spring shackles and bolts, steering gear and other bearings. The outlet of each branch and the ends of the mains are provided with or constitute terminals applied in general each directly to the non-turning element of the bearing to be supplied therefrom. Pipes or conduits of suitable flexibility (not shown) may be employed to bridge from the mains, or from one of the mains, to mains on one or both of the axles and/or other parts that perform relatively large movements with respect to the frame in use of the vehicle, such as for instance, the steering knuckles, and the brake rigging. The construction, arrangement and mounting of the pipes, bores or other lubricant-conveying conduits on the vehicle or on the lubricated elements of the vehicle, are not in themselves part of the invention claimed herein and are, accordingly, not further described. The term "main" as employed in certain of the claims includes any or all of the lengths designated as mains in the foregoing, together with the piping connecting said lengths.

The outlet terminals $t'$ at the ends of the mains and those controlling the delivery to the bearings supplied from the ends of the flexible branches or taps (not shown) are each preferably drip plugs of the construction shown in Fig. 2. At some places the drip plugs are embodied in the T fittings shown in Fig. 3. These fittings may be used, for instance, in the run of mains on the frame or on the axles (not shown), the stems of said fittings constituting taps or branches, applied at bearings, such as the rear shackles of the front springs. The entire length of piping from the pump to each of the drip plugs is preferably of rigid small diameter seamless piping which is substantially non-dilatable under the operating pressures employed.

The terminals or drip plugs of Figs. 2 and 3 per se are separately claimed in copending applications, Serial No. 126,115 filed July 31, 1926, and Serial No. 191,280 filed May 14, 1927. The reservoir and pump assembly is separately shown in Fig. 4 and is claimed per se in a copending application, Serial No. 131,640 filed August 26, 1926. The reservoir per se and the air excluding or rejecting structure of the assembly shown in Fig. 4 are claimed in my copending application, Serial No. 132,141 filed August 28, 1926. The construction by which the assembly is associated with the motor vehicle is claimed in my copending application Serial No. 182,362 filed April 9, 1927, and in the division of said latter application, Serial No. 193,090 filed May 21, 1927, in which is claimed particularly the means for draining off pump leakage. In the present application, I claim the combination of elements making up the lubricating system or installation, rather than the constituent elements thereof per se. The claims to the lubricating system involving the air rejecting feature as an element thereof appear in another copending application, Serial No. 132,691 filed August 31, 1926.

The drip plugs.

The terminal or drip plug construction shown in Fig. 2 comprises a machined pipe fitting or bored rod 10 having a pipe thread 11 at one end for application at a bearing or other support structure in communication with a bearing. At the opposite end, the fitting has a cylindrical thread 12 for application thereto, by means of an appropriate coupling, of the extremity of the feed pipe p. I have illustratively shown a flare coupling pipe connection, the previously flared end 13 of the pipe being pressed by the inclined shoulder 14 of a coupling nut 15, screwed upon the thread 12, against the correspondingly tapered end 16 of the fitting 10. The nut is elongated as shown and thereby precludes any sharp bend in the pipe, too close to the flare end.

The drip plug is provided with a longitudinal bore 17 of accurately predetermined diameter nearly filled by a length of pin or wire 18 also of accurately predetermined diameter, thereby forming a highly restricted annular crevice of substantial length. As shown, the bore is enlarged at its opposite ends at 19 and the ends of the pin extend into said enlargements so that the flow restricting crevice is of accurate predetermined uniform cross-section from end to end.

Slow draining of the pipe line in the intervals between pump operations through one or more drip plugs at lower level, is prevented by relief valves preferably at or in association with each of the drip plugs.

The relief valve comprises a metal disk or button 20 in a corresponding cavity 21 at the outlet end of the fitting, held against a convex annular valve seat 22 in the fitting by a coil spring 23 reacting against a perforated cup 24 pressed into the cavity 21. The seating surface of the valve is provided with a facing 25, smooth to seat completely and to take the impress of the valve seat under light pressure, substantially impervious, chemically inert to oil and non-sticking. Oil-silk or varnished silk is preferred for this purpose.

At the inlet of the fitting, I provide a strainer of absorbent or porous, more specifically of matted fibrous material. Preferably this strainer is a wad or plug 26 of wool felt lodged in a socket 27 in advance of the restriction pin 18 and serving to intercept any solid particles that might otherwise be carried by the oil to the restriction passage or relief valve. The felt plug is so small in diameter as to be readily accommodated within the small fitting without any special enlargement therefor. It has substantial thickness as compared to a woven screen, so that solid particles that may pass the surface of the felt are intercepted within the body thereof. The effective straining area of the felt is thus many times that of its end surface. A woven screen, if of sufficiently fine mesh to be effective might soon clog, unless made of such large area as to necessitate an increase in the size of the fitting. The felt is backed by a cup 28 of fine metal mesh forced thereover and serving to prevent any loose fibres of the felt from passing to the valve seat 22 and also to prevent the wad from being forced beyond the shoulder 29 against which the cup 28 seats. The felt is held in place within the cartridge by a press-fitted centrally perforated cup 30 at the inlet end thereof. In the construction shown, the restriction pin 18 requires no separate support, being maintained in position within the bore by the relief valve 20 at one end and the strainer plug 26—28 at the other.

The oil-silk or varnished silk valve facings, and the wool felt strainer plugs are sufficiently heat resistant to withstand the temperature in the chamber through which the completed chassis is conveyed in mass production, for the purpose of hardening or drying a coating of japan or varnish sprayed thereon.

The cross-sectional area of the annular crevice 17—18 though minute, can be made uniform within very fine limits, since it is the difference between the cross-section of a short bore and a wire filler, both of appreciable dimensions and both of which can be easily formed accurately by automatic machinery.

The restriction pin 18 determines a fixed invariant passage, which neither requires nor permits of adjustment. For a given propelling pressure upon oil of a given viscosity, the drip plug is thus calibrated to emit accurately at a constant rate. In a preferred embodiment, the effective length of bore 17 is about $\frac{1}{16}$ inch and its diameter .063 inch. The restriction pin may have a diameter of .061 inch. Under an oil pressure of about 50 pounds per square inch, exerted on medium heavy motor oil at a temperature of about 70 degrees F., a drip plug of the specifications set forth will emit by dripping at a rate of about .10 c. c. per minute. By the substitution of a restriction pin .060 inches in diameter, that is, only .001 inches less in diameter, the rate of emission is approximately doubled. With the use of a pin of .059 inches in diameter, that is .002 inches less, the rate is approximately trebled. With a pin of .057 inches in diameter, the rate is found to be about 1 c. c. per minute. The dimensions specified of the bore and of the pins are with tolerances of two ten thousandths of an inch ($\pm$ .0002) greater or less. Thus, the rating of the drip plug is determined solely by the gauge of restriction pin employed, the other parts of the drip plug remaining the same. In practical use, the drip plugs are preassembled, and each bears a rating mark (not shown). A drip plug with a .061 pin, for instance, would be called a No. 1 plug, one with the .060 pin a No. 2 plug, etc.

For bearings, such as the brake cross shaft bearings which require but little oil, No. 1 drip plugs, that is, plugs of the slowest rating would be employed; the hinge eye bolts of the springs which require more oil would each be supplied from a No. 2 drip plug, the spring shackles each of which has two bearing bolts would be equipped from a No. 3 or 4 drip plug, and the steering knuckles, which require still more oil would be equipped with drip plugs of still faster rating.

All of the drip plugs, five, ten, twenty or more in number, offer a flow resistance when thus connected in parallel, substantially in excess of that incurred in the entire length of piping leading thereto from the pressure source, or inlet, even though piping of bore diameter as little as ⅛ inch is employed. The drip plugs in parallel substantially sustain the pressure applied at the source, each dripping at its predetermined slow rate.

It follows from the slow rate of propulsion of the oil through the piping system, that the pipe line is nearly equi-potential in pressure throughout its length during emission. With drip plugs of the specifications set forth or of equivalent specifications, the drip plugs are substantially determinative in themselves of the rate of emission therethrough, with but small differences for substantial diversities in the lengths of pipe intervening between them and the source of pressure. The resistance even of the coarsest drip plug set forth, which drips at rate faster than its companions is high relative to that of the longest pipe line intervening in a chassis lubricating system between the source of pressure and a drip plug. The pin-restricted bore has a higher resistance to flow than the combined resistance of the relief valve and the felt plug of the drip plug, so that variations in the strengths of valve springs and in the resistances of the felt plugs, do not markedly affect the rating, which is substantially determined by the pin-restricted bore.

Thus, drip plugs of the required fixed ratings are applied at the bearings, the pipe lines are connected thereto by the couplings set forth and each bearing will receive its correct proportion of oil from the common supply piping. Changes in the viscosity of the oil, with an unchanged propelling pressure, will bring about changes in the absolute rate of emission of each drip plug, but the relative rates remain substantially constant, and, as noted, each bearing receives its correct proportion of oil.

It is within the scope of my invention as defined by certain of the broader claims, to provide the relief valves apart from the drip plugs and well in advance thereof, say one to feed each group of drip plugs that are substantially at a common level. Such arrangement involves the use of a reduced number of relief valves in a piping installation, but each relief valve would here involve an added fitting with associated junctions and mounting appurtenances; each said valve fitting would also require a protective strainer and would have to accommodate the flow to the plurality of drip plugs supplied therefrom. The arrangement described in which each drip plug includes a relief valve is, accordingly, preferred for most installations.

The T drip plug of Fig. 3 has a T stem substantially of the construction of the drip plug shown in Fig. 2. Corresponding parts are, accordingly, designated by the same reference numerals as in Fig. 2 but primed. The stem 10' has a pipe thread 35 at its inlet end screwed into a corresponding socket 36 midway between the ends of the cross-arm piece 37. The extremity of the stem beyond the pipe thread 35 is reduced to provide for free flow of the lubricant through the socket 36 between the nipples 38 at the opposite ends of the T head. Segments of the supply pipe are connected to the nipples by couplings (not shown) similar to that shown in Fig. 2, and the ends of the nipples are tapered for this purpose, as shown at 40.

*The reservoir and the pump.*

While pressure may be applied to the pipe line by any suitable instrumentality, I will now describe a desirable oil supply installation, especially suitable for, though by no means limited in its field of application to chassis lubricating systems.

I have shown a reservoir comprising a cylindrical sheet metal wall 45 into the upper end of which is telescoped a stamped metal cover 46 having a machined neck 47 friction-fitted and soldered thereinto.

A filter disk 48 is peripherally clamped in position at the lower end of the cylinder, preferably between a stamped frame collar 49 thereabove and a cast reservoir bottom 50 therebelow. For assembly, the bottom is first soldered in place, the filter disk is then laid thereon to rest upon upstanding ledge 54 of the bottom. The stamped frame collar 49 and the lock ring 51 are then forced into place, the lock ring snapping into groove 52 of the reservoir. The frame collar 49 has an outstanding inner periphery 53 in registry with ledge 54. Thus, in the assembly, the periphery of the filter disk is securely clamped in place and substantially constricted where clamped, as shown. To relieve the filter of the weight of oil thereabove and of the suction effect due to the pump hereinafter described, a sheet metal backing cup 62 is provided, the rim of which rests on corresponding spaced lugs 63 formed therebelow, integral with the bottom 50. A pair of pipes 55 serve to vent the oil chamber 57 below the filter 48. These pipes extend through the filter and are spun over at their lower ends at 64 for attachment with respect to backing cup 62. Pipes 55 at their upper ends extend into, and are sustained at bores 59 in the neck, said bores breaking through at 60 to a vent groove 61 in the neck. The backing cup 62 performs the additional function of protecting the filter from rupture due to pressure transmitted through vent pipes 55 in applying the neck 47. An oblique bore (not shown) extends through the neck and terminates at the undercut part 66 of thread 67 on the closure cap 68 of the reservoir, so that dirt is substantially excluded therefrom and serves to vent the interior of the reservoir and through the vent pipes 55, the filter chamber 57. The venting aperture 60 and the oblique venting aperture (not shown) are partly closed by split ring 69, which blocks the entry of dust and also aids in retaining a strainer cup 70 suspended from the neck.

The reservoir bottom has an integral axial frusto-conical cup 75 extending downward therefrom. A check valve V is mounted near the upper end of the cup and comprises a cage 76 threaded into the upper end of the cavity and providing a valve seat 77 at its lower face. The valve comprises a sheet metal disk 78 faced with a seating disk 79 of impregnated fibre board thereover, and backed by a conical button 80 therebelow. The valve is normally suspended in open position below the seat 77 by a valve hanger, comprising a sheet metal disk 81 encircled by the seating area of the facing disk and having a plurality of upstanding fingers 82 bent outward, to form stop flanges 83 normally resting on top of the cage 76, as shown. A rivet 84 centrally through the disk 78, its facing 79, the button 80 and the hanger 81 secures said parts together in a unitary structure.

The preferred pump comprises a cylinder which may be obliquely arranged, as shown, and constitutes a length of pipe 90 threaded at its lower end into a socket 91 in the correspondingly thickened part 92 of the wall of cup 75. The pump draws its charge from cup 75 through a port 93 aligned therewith and of relatively large diameter. The pump ejects through a smaller port 94 in the thickened part of the cup to the head of the pipe line, which is connected to the pump by a nipple 95. The pump cylinder is closed at its top by a press-fitted bushing 96 from which extends the piston rod 97. The outer end of the piston rod has an operating knob 98 and the lower end has affixed thereon, the usual cupped leathers 99. A coil spring 100 encircles the piston rod but is out of contact with the inner surface of the cylinder and reacts at its upper end against bushing 96 and at its lower against washer 99'. In the bottom of socket 91 is provided a seating disk 101 of fibrous gasket material, which is held in position by lock wire 101'. The piston is normally urged by the spring 100 against disk 101 to close the upper end of the pipe line and so prevent escape of oil from any single drip plug valve which might not be absolutely tight or to prevent escape of lubricant from any single minute leak in the piping. The seating of the piston, moreover, prevents draining of the reservoir through a leaky part of the pipe system or a leaking valve. The disk 101 has ports maintained in registry with ports 93 and 94 respectively by a short tube 102 extending into the latter port.

In order to provide a self-aligning seat for the pump piston and to protect disk 101 from damage and consequent leak due to the high impact thereagainst, should the pump handle be drawn outward and let go in the absence of oil, I have provided a spring cushioning construction. This comprises a seating thimble 103 having an edge 104 turned inward over the flange 105 of a sleeve 106 threaded upon the reduced extension 107 of the piston rod. A coil spring 108 within the thimble normally holds it in outer position, as shown. If the pump piston is drawn outward at a time when the reservoir is substantially depleted of oil, and then let go, substantially only the weight of the light thimble 103 will be projected against disk 101 by the powerful expansion of spring 100, the smaller spring 108 thereupon yielding to cushion and relieve the impact due to the relatively great momentum of the piston rod. The piston inertia is taken up by the nut 98' below knob 98 stopping against the outer end of the pump cylinder.

The suction being exerted by the cupped leathers 99, the thimble 103 which normally extends into the extremity of the cylinder 90, need not fit snugly. Preferably, it should have a fit sufficiently loose therein, to avoid being clamped or seized due to the compression of said cylinder, when screwed into mounted position.

In the preferred embodiment, applied to a motor vehicle, the reservoir and pump assembly is mounted as indicated at Fig. 4, the reservoir being held in position in front of the dash by appropriate bolts 110 passing through lugs 111 near the upper end of the reservoir and screws (not shown) threaded into integral lugs 112 formed on the base or bottom. The bolts 110 also serve to secure in position a generally triangular bracket 113 for the outer end of the pump cylinder 90 which projects obliquely backward through a corresponding aperture 114 in the dashboard D, for convenient operation from the driver's seat.

In order to dispense with the use of packing at the handle end of the pump which packing might render the manual operation hard and introduce irregular friction on the down or discharge stroke, I provide means to allow any oil which may have passed during a stroke, above the cupped leathers 99 to escape through one or more transverse apertures 115 in the cylinder, immediately beyond the outermost position of the piston. The apertures 115 being directly over the floor of the vehicle, means is provided to direct any surplus oil to the engine side of the dash, so oil will not drip to the floor, nor even soil the part of the pump exposed to the driver. For this purpose, a cylindrical guard 117 of somewhat larger diameter than the pump cylinder is telescoped thereover, and has an inturned upper edge 118 in snug engagement with the cylinder above the opening 115 and short pressed-in ribs 119 at the lower end affording passages through which will escape, any oil ejected from apertures 115.

*Operation.*

The reservoir and pump assembly being connected to a plurality of bearings through a system of small bore non-dilatable piping, as suggested in Fig. 1, with drip plugs at their outlets, of the construction shown in Figs. 2 and 3, and the oil reservoir being assumed charged with lubricant, the manual operation includes the single step of withdrawing knob 98 of the pump to the end of its stroke and letting go. Thereafter without any further attention on the part of the operator, each of the plurality of bearings on the line is correctly and adequately lubricated.

In the manual or charge stroke of the knob, lubricant is admitted to the pump as rapidly as the piston is drawn outward against the resistance of spring 100 and this by reason of the large diameter and correspondingly low resistance of valve seat 77 and of port 93, it being noted that the filter chamber 57 from which the pump draws its charge is effectively vented through pipes 55, whereby air-lock is prevented.

The spring 100 being preferably under substantial compression, even in its most extended position in the pump, the manual effort required in my construction to overcome or compress it, is not much greater at the end than at the beginning of the charging stroke. The pump spring exerting a maximum pressure, of say 30 pounds, the pressure on the line and at the drip plugs, making allowance for friction losses, will be about 60 pounds per square inch, where the pump piston has an area of about ⅓ square inch. The pump having no friction packing and the spring not rubbing against the cylinder wall, the pump is relatively efficient and the maximum pull required for operation is about 30 pounds.

After the charging operation is thus completed, and the operating knob let go, the expansion of the spring 100 will force the piston inward upon the body of oil confined in the cylinder. By reason of the substantial resistance or viscosity of the oil, the valve V will be forced upward against its seat in the reservoir R, acting as a check valve to prevent return of lubricant to the reservoir, and the lubricant is thus forced out of the pump cylinder through the length of the pipe system and in parallel through the plurality of drip plugs. The drip plugs offering a high resistance to the flow of lubricant therethrough, the descent of the piston even under the expansion of the compressed spring 100 will be relatively slow, as the force is transmitted through the incompressible column of oil filling the pipe between the pump and the outlets.

The combined rate of emission of the drip plugs is equal to the rate of admission of oil from the pump into the pipe line, and the piping system connects the various drip plugs in pressure communicating relationship with each other throughout emission. In this operation, the maximum effort of the spring is exerted as soon as the operating knob is let go, so that the maximum pressure is applied substantially at the outset.

This pressure exceeding several times the seating pressure of each of the various drip plug valves, and the restriction outlets sustaining the applied pressure, pressure will rapidly build up throughout the line, and the valves will crack open substantially concurrently regardless of manufacturing differences in the strengths of their seating springs, and in the lengths of pipe leading thereto. The pressure will be sustained throughout the discharging operation, since the compression of the pump spring is not much reduced even toward the end of the stroke. The spring is thus effective to discharge the cylinder 90 completely and to seat the piston as shown in Fig. 5 whereupon the relief valves at all of the drip plugs will close to prevent escape of oil from the length of the pipe line, which thus remains filled at all times. While I prefer to employ a spring-discharged pump, any other type of self-discharging pump is desirable.

By reason of the reliable distribution, effected by my system, an excess of oil need not be delivered to some bearings in order to assure a sufficiency at others. The pump has a volume sufficient merely to supply the various bearings without excessive overflow at any bearing. For chassis lubricating purposes, the pump volume would generally be between ½ and 1½ cubic inches, depending on the character of bearings to be supplied and on their number, which for some vehicles may be as few as 20, and for others as many as 60. Thus, I avoid not only the waste of oil resulting from excessive overflow at some or all of the bearings, but also the likelihood of the oil spreading over the exposed surface of the vehicle and soiling the clothes of the passengers, not to mention the catching of dust by the spreading oil, the difficulty of cleaning and the possibility of excess oil dropping onto and rotting the tires.

There being ordinarily a substantial interval between successive operations of the pump, operation once a day being usual, it follows that even when the lubricant in the reservoir is low, sufficient will have seeped through the filter disk 48 in the interval between operations to provide a filtered supply in chamber 57 from which the pump is charged. The pump will, therefore, operate effectively almost until the reservoir is completely drained of lubricant.

The need for replenishing the reservoir when nearly drained will become immediately apparent to the operator by the rapid settling or snapping back of the pump piston, when operated under this condition, where, on the other hand, in the normal operation, the pump piston settles but slowly as it forces oil through the highly restricted drip plugs.

The large filter 48 intercepts any solid particles of dust carried with the oil, and thereby prevents clogging of the strainers 26 at the drip plugs, by the accumulation thereat of such foreign matter. The strainer wads 26 in the drip plugs intercept any chips, dirt or scale left in the line which may be entrained with the oil in its flow therethrough, even when the oil drawn by the pump is clean. The seating of the relief valves will, therefore, not be impaired by any chips or dirt which in the absence of the filter or strainer might become lodged at a relief valve seat and cock the valve to permit oil to leak therefrom even when pressure is not applied to the line. Moreover, by the arrangement set forth, the restricted crevice outlet or resistance is unlikely to become further restricted or clogged by dirt intercepted thereat. The system being nearly equi-potential at all points on the line, as previously set forth, any and all drip plugs may be replaced by others of different rates, and additional drip plug outlets may be applied wherever required in the line, without other change and without in any way impairing the efficacy of the system.

By pulling the pump knob through a range less than its full stroke, a reduced charge of oil may be supplied to each bearing and by pressing or leaning on the plunger, an increased discharge pressure may be generated. Great increase of viscosity of the lubricant in winter does not entail any corresponding increase in the manual effort to charge the pump. Only the absolute rate of discharge would be affected, the pump taking possibly 20 seconds to 2 minutes to discharge in summer, and depending on the temperature and the grade of oil used, from ten minutes to several hours in winter.

For lubricating continuously-operating bearing surfaces of heavy machinery, means may be provided for applying a sustained pressure to the line for continuous feed of oil or heavier lubricant. In the absence of relief valves on such installations and in view of difference in level of outlets, the line pressure due to the pump should be so high that such differences are not controlling, that is, the line pressure should be at least twice the maximum difference of head. My system, however, as heretofore pointed out, has its preferred application for chassis lubricating or in similar relations, where lubricant is to be passed to the bearings, not continuously, but only in small quantities from time to time, and where the pipe line is to be maintained charged at all times up to the control outlets.

My system is closely analogous in operation to a constant potential electrical circuit in which high ohmic resistances such as lamps connected in parallel correspond to the drip plug resistances, a generator or battery corresponds to the pump and electric conductors connecting the ohmic resistances to the source of electromotive force correspond to the pipe lines.

For correct operation of the system as previously pointed out, it is desirable that the pressure in the pipe line rise promptly to a value considerably in excess of the spring pressure seating the various valves. Were any parts of the pipe system between the pump and the drip plugs so constructed as to afford the possibility of trapping air therein, such air would yield and permit of but a slow rise of pressure as oil is forced into the line. If more than a small quantity of air were trapped, the pressure in the pipe line, even near the end of the pump stroke would remain relatively low. The subsequent slow expansion of the trapped air after the pump stroke has been completed would bring about irregular and sluggish emission and the division would not be so accurately determined by the ratings of the drip plugs. Trapped air under compression might moreover expand into the pump cylinder and thereby interfere with the sucking action of the pump plunger.

With the pipe line intact and completely filled with oil, the rapid descent of the pump plunger after operation, reliably indicates the absence of oil in the reservoir. With air trapped in the pipe line, such rapid descent could occur even with a filled reservoir, and this action would no longer give a reliable signal of the need for oil.

It is apparent that were the pipe wall dilatable, faulty operation analogous to that due to air trapping and just described would occur to a degree.

My pipe system will not trap any air therein, for all parts thereof, including not only the pipe lengths but preferably also the various fittings therein such as those of Figs. 2 and 3 have preferably a maximum bore not exceeding ⅛ inch diameter, which is too small to permit flow of oil about any air thereon. The new installation can thus readily be prepared for use by alternately pulling the pump plunger and letting go, until presently the plunger settles slowly. In mass production of motor cars the entire line would preferably be charged more expeditiously from a source of oil under pressure by applying an oil nozzle communicating with said source, at or near the inlet to the pipe system, before connecting up the reservoir-pump assembly. The pipe line when charged by either method is completely filled with oil, the air having been pushed through the drip plug outlets by the oil, and the presence of oil being noted by inspection at each of the bearings.

If oil free from air is now forced into the head of the pipe system, the pressure is reliably transmitted to the outlet drip plugs as long as the system remains completely filled with lubricant, which serves as an incompressible pressure-transmitting agency. My construction avoids the objectionable introduction of any air into the pipe line, for, even if the pump were operated with the reservoir empty or substantially empty, the operativeness of the system would not be impaired. When the oil in the reservoir is down to a level below valve V, the pump, having a volume less than that of cup 75, will draw only oil from said cup, and in its discharge will return the oil to the cup. The air entering the cup from the reservoir when the pump is charged, would in its return to that empty reservoir during pump discharge exert insufficient lifting force by reason of its low viscosity, to raise or seat the valve V. Thus the cup 75 will always have a charge of oil therein greater than the volume of the pump, regardless how often the pump is operated without recharging the reservoir. The pump leathers being at low level relative to cup 75, the pump is automatically and reliably primed.

When the level of the oil in the reservoir drops below the valve V, if a jet from the pump could impinge on valve V, it would be likely to force it upward against its seat and thereby trap air. This is obviated by directing the port 93, as shown, at an angle to the valve V, so that the jet will not impinge thereon, the oil being ejected from the pump to the enlarged cup 75, wherein the velocity of the jet will be dissipated, allowing the level of the oil to rise without much agitation, so that the air remains above the oil and passes through the valve before the oil level comes up to it. The conical button 80 at the lower surface of the valve, moreover, acts as a guide to deflect to the reservoir the air returned by the motion of the pump.

The distributing piping, the outlets of which are closed by the relief valves in the drip plugs will, accordingly, remain completely charged at all times with oil, devoid of any air bubbles, and this regardless whether the pump is operated with the reservoir full or empty. It will be apparent from the foregoing description that while the air rejecting device is preferably a part of the reservoir-pump assembly, it is within the scope of my invention as defined in the claims of my copending application Serial No. 132,691 to provide a device of this character in the pipe line, beyond but preferably near the pump.

The seated pump piston prevents the entry of air to the head of the pipe line, so that lack of tightness at one locality in the line or at one drip plug will not result in loss of oil from the line or in loss of the reservoir contents through the leak. Any one fitting or pipe length can, accordingly, be removed and replaced without material loss of oil from the installation.

In the first pump charging operation, after the empty reservoir is replenished, oil is first drawn into cup 75 from the reservoir and upon the subsequent discharge stroke of the pump, the valve V by reason of its relatively large diameter permits ready ejection of any air into the reservoir, from which the air escapes through vent pipes 55. The operation when repeated after replenishing the reservoir, accordingly, proceeds without impairment, and in the manner heretofore described. No check valve is required, between the pump and the pipe line, since the suction of the pump in its charging stroke draws from the filter chamber 57 rather than from the much more highly resistant pipe system, which has all of its ends closed by the drip plug valves.

I claim:—

1. An installation for lubricating a plurality of widely distributed bearings including self-contained flow controlling fittings of fixed invariant flow resistance, mounted at the fixed elements of the several bearings, a source of lubricant and of pressure, a common pipe line of bore so small as to preclude the flow of oil about any air therein, leading from said source to all of said fittings, and connecting the latter in pressure transmitting communication with each other throughout emission from the fittings, there being substantial diversities in the resistance of pipe line interposed between the inlet and the various outlets, the resistance of each of said fittings being greater than that of the pipe line and that of the bearings, to thereby determine the flow to the bearings regardless of the tightness or looseness of the latter, said fittings having resistance so correlated with the pressure at the source as to substantially control the rate of admission through the inlet under the applied pressure, and substantially closed to prevent emission during the intervals between pressure applications.

2. The installation as claimed in claim 1 in which the flow control fittings are constructed to have divers fixed ratings, each fitting including a pair of rigid parts of character readily made in quantity production, and associated in substantially fixed relative position to determine therebetween a minute fixed crevice, the dimensions of one of said rigid parts of the fitting determining the magnitude of the crevice and the rating of the fitting.

3. An installation for lubricating a plurality of widely distributed bearings at different levels including self-contained flow controlling fittings of fixed invariant flow resistance mounted at the fixed elements of the several bearings, a source of lubricant and of pressure, a common pipe line of bore so small as to preclude the flow of oil about any air therein, leading from said source to all of said fittings and connecting the latter in pressure-transmitting relation with each other throughout emission from the fittings, said fittings substantially closed to prevent exit of lubricant under the head due to the difference in level thereof, and presenting a resistance to flow of lubricant so great relative to that of the rest of the pipe line that as to fittings having the larger part as well as to fittings having little of the pipe line resistance between them and the source, the resistance of the fitting will substantially determine and control the distribution therethrough, the pressure at the source being so correlated with the resistance of said fittings that the latter substantially control the rate of admission through the inlet under the applied pressure, regardless of the tightness or looseness of the bearings.

4. An installation for lubricating a plurality of widely distributed bearings including self-contained flow controlling fittings of fixed invariant flow resistance mounted at the fixed elements of the several bearings, a source of lubricant and of pressure, a common pipe line leading from said source to all of said fittings, there being substantial diversities in the resistances of pipe line interposed between the inlet and the various outlets, the resistance of each of said fittings being greater than that of the pipe line and that of the bearings, to thereby determine the flow to the bearings regardless of the tightness or looseness of the latter, said fittings in multiple substantially controlling the rate of admission through the inlet under the applied pressure, each of said flow control fittings embodying at the respective inlets thereof a felt strainer plug for intercepting any solid particles carried with the lubricant.

5. A centralized lubricating installation comprising a piping system having a main pipe, an inlet thereto, distributed flow restricting outlet fittings supplied from various parts of the length of said main, each fitting including a relief valve, normally closed to maintain the system always filled with lubricant, said system connecting said fittings in pressure transmitting communisation with each other throughout emission therefrom, said fittings of flow retarding effect such as to be in themselves substantially controlling compared with that due to the resistance of the length of piping, and to govern the rate of admission to the system under an applied pressure several times that required to open the relief valves, a single pressure chamber at said inlet and means for subjecting said chamber to substantially said applied pressure.

6. A centralized lubricating installation comprising a piping system having a main pipe, an inlet thereto, distributed outlet fittings supplied from various parts of the length of said main, each fitting including a flow restriction, a relief valve and a porous strainer for protecting the other elements, said relief valve normally closed to maintain the system always filled with lubricant from the inlet to the various fittings, said fittings imposing a flow retardation such as to be in themselves substantially controlling compared with that due to the resistance of the length of piping, and to govern the rate of admission to the system under an applied pressure several times that required to open the relief valves, a single pressure chamber at said inlet and means for subjecting said chamber to substantially such applied pressure.

7. An installation for lubricating a plurality of distributed bearings, said installation including a piping main having an inlet and having outlet branches extending from various parts of the length of said main and leading in multiple to the various bearings, a source of lubricant at the inlet of the piping system, means for intermittently and under pressure injecting lubricant from said source into said inlet, each of said outlet branches having therein a highly restricted metering device through which the lubricant passes at the same rate that it is forced into the corresponding branch, relief valves spring-seated to prevent emission from said metering devices during the intervals between successive applications of lubricant pressure, the resistance of said metering devices to flow being higher than that incurred in the length of piping, and being so correlated with the source as to substantially sustain the pressure transmitted from the source, whereby the entire piping system remains throughout emission to the bearings under a pressure potential substantially of the order of that at the source and means to automatically maintain said inlet closed during the intervals between lubricating operations.

8. A central installation for lubricating a plurality of distributed bearings and comprising a single source of lubricant, means for intermittently applying pressure at said source, a piping main supplied from said source and having flow rate controlling metering units, supplied in multiple from taps at various parts of the length of said main, each said unit of a fixed invariant capacity throughout use, means to maintain the piping system filled with lubricant during the intervals between applications of pressure at the source, the resistance to flow of said metering units in multiple being so correlated with the source as to substantially sustain the pressure transmitted from the source, and of order higher than that incurred in the length of the piping, whereby said units will discharge slowly to the bearings during pressure application at the source, and at rate determined largely by the resistance of said units, and means to automatically maintain said inlet closed during the intervals between lubricating operations.

9. An installation for lubricating a plurality of distributed bearings, including a source of pressure, a pipe line connected thereto and having branches leading to said bearings in multiple, each of said branches having a control unit presenting a resistance to flow of lubricant so great relative to that incurred in the rest of the pipe line length that as to units having a larger part as well as to units having little of the pipe line resistance between them and the source, the resistance of the unit will substantially determine and control the distribution therethrough, a single intermittently operated pump supplying lubricant to the system, the entire system from the pump to the exits of the various units having a substantially fixed invariant capacity, said system including relief valves to prevent escape of lubricant from the line during the intervals between successive pump discharges.

10. An installation for supplying lubricant concurrently to a plurality of distributed bearings and comprising a piping main, having a single inlet and a multiplicity of outlet units connected to various parts of the length of the main and leading to the bearings, said units having highly restricted metering orifices connected in pressure transmitting communication with each other throughout emission, means for intermittently forcing a measured charge of lubricant into the pipe inlet, means to maintain the piping system filled with lubricant during the intervals between pressure operations at the inlet, said metering orifices offering a resistance to flow such as to substantially sustain the pressure transmitted from said source, whereby the pressure will be transmitted rapidly from the source through the incompressible body of lubricant within the piping to the various orifices, and will be sustained until the measured charge has been forced slowly into the inlet.

11. An installation for lubricating a multiplicity of distributed bearings concurrently, said installation comprising a source of lubricant, a pipe system supplied therefrom and having branches leading to the various bearings, highly restricted metering orifices in said branches, said system connecting said orifices in pressure transmitting communication with each other throughout emission from the outlets, said system being lubricant-tight from its inlet to said ortifices, spring-seated relief valves in the pipe system arranged to preclude the entry of air into any part of the oil filled pipe system between the source and the various metering orifices, said metering orifices presenting a resistance to flow so high compared to that imposed by the relief valves added to that of the lengths of conduit, as to be themselves substantially controlling of the rate of emission therethrough under a given pressure, means forcing lubricant into the pipe line from the source under a pressure of higher order than required to open relief valves, the applied pressure and the resistance due to said metering orifices being so correlated that the latter substantially retard the rate of admission from the source into the pipe line, whereby in operation, pressure will be transmitted rapidly to open the various relief valves substantially concurrently, and will be sustained to cause slow emission through the metering orifices.

12. An installation for supplying lubricant to a multiplicity of distributed bearings from a single source, said installation comprising a piping system having an inlet communicating with said source and branches leading to the various bearings, terminal fittings for said branches, each including a spring-seated relief valve, and also an accurately predetermined highly restricted passageway, imposing a resistance to flow high compared to that imposed by the spring-urged relief valves added to that of the length of pipe line, means pre-measuring a charge of lubricant at said source, means exerting upon said charge, a pressure of higher order than that seating said relief valves, the applied pressure and the terminal fitting resistances being so correlated that the latter substantially retard the rate of admission from the source, said piping system connecting said restricted passageways in pressure transmitting communication with each other throughout emission therefrom to the bearings, whereby in operation, the applied pressure will be sustained until the predetermined measured charge has been forced into the line.

13. A central lubricating system including a source of pressure, a piping main line supplied therefrom and outlet fittings supplied in parallel from various parts of the length of said main, each of said outlet fittings being of character such as to be subject to derangement by the introduction of solid particles thereat, each of said fittings including a flow resistant felt strainer plug of such density and thickness as to entangle and hold any solid particles in the lubricant, and a restriction protected by said plug, and offering a resistance to flow so high, as to render the resistance of the felt plug low by comparison, said outlets being so correlated with the pressure at the source as to substantially govern the rate of lubricant flow.

14. An installation for lubricating a plurality of distributed bearings, comprising a single pressure pump, a pipe line communicating therewith and affording a dust-tight course for flow of oil to said bearings in multiple and including restricted outlets of fixed predetermined high flow resistance at the various bearings, said outlets being so correlated with said pump as to substantially retard the free discharge thereof, and an oil filter near the pump, and of effective area many times as great as that of the combined cross-sectional area of the outlets and of resistance to flow less than that of said outlets.

15. A central lubricating system including a source of pressure, a piping main supplied therefrom and drip plugs supplied in parallel from various parts of the length of said main, each of said drip plugs offering a high resistance to flow and being of character such as to be subject to derangement by the introduction of solid particles thereat, each of said drip plugs having associated therewith a protective strainer capable of holding lubricant in its interstices by capillarity, fine enough to intercept particles that might derange the drip plug, and open enough to pass lubricant with a pressure loss less than that incurred in the drip plug resistance, and a filter of larger area near the pump serving to protect the strainers from becoming clogged.

16. A central lubricating system including a piping main having an inlet, drip plugs supplied in parallel from various parts of the length of said main, each of said drip plugs offering a high resistance to flow and including a fixed metering orifice, each of said drip plugs having a fibrous protective strainer wad in advance of said orifice, fine enough to intercept particles that might derange the drip plug and open enough to pass lubricant with a pressure loss less than that incurred in the metering orifice and in the length of pipe leading thereto, a backing screen for the strainer wad to protect the drip plug from any fibres coming loose from the strainer, and means for forcing lubricant under pressure through said inlet and thereby effecting emission through the metering orifices in multiple.

17. An installation for lubricating a plurality of distributed bearings and including a pressure pump, a piping line communicating therewith and extending to said bearings in multiple, flow control devices in the outlets to the bearings calibrated for diverse fixed discharges, and of character such as to be subject to derangement by the lodging of solid particles thereat, a porous filter adjacent the pump, fibrous strainer plugs in advance of the flow control devices, each of said strainer plugs having a fine mesh backing screen whereby the strainer plugs will intercept any solid particles such as scale collected in the line of flow, the filter will intercept any solid impurities from the lubricant admitted to the pipe line, thereby protecting the strainer plugs from clogging, and the backing screens will prevent the oil entraining fibres from the strainer plugs into the flow control devices.

18. An installation for supplying lubricant to a plurality of distributed bearings from a single source of pressure, said installation comprising a pipe main connected to said source and having branches tapped at various parts of the length of the main and leading to the various bearings, each of said branches having a highly restricted metering orifice therein, spring-seated relief valves in said piping system maintaining the system completely filled with oil during the intervals between pressure operations, and strainers in said piping system intervening between the main length thereof and the various relief valves and metering orifices, and adapted to intercept and keep from the valves and metering orifices, any scale from the pipe or any chip of metal introduced into the pipe in making the same up, said metering orifices offering a resistance to flow, which is in itself controlling substantially regardless of the resistance due to the rest of the system and the various parts thereof.

19. An installation for supplying lubricant to a plurality of bearings from a single source, said installation comprising a pipe line connected to said source and having branches leading to the various bearings, each of said branches having a metering orifice therein, spring-seated relief valves in said piping system near said orifices and preventing leak from the oil filled piping system, strainers in said piping system intervening between the main length thereof and said valves and metering orifices and adapted to intercept and keep from the said valve and orifices any scale from the pipe or any chip of metal introduced into the pipe in making the same up, said source comprising a pump which exerts an initial discharge pressure of higher order than that seating the relief valves, said metering orifices being so correlated with the pump discharge force as to greatly retard free pump operation.

20. An installation for supplying lubricant to a plurality of bearings from a single inlet, said installation comprising a pipe line connected to said inlet and having branches leading to the various bearings, each of said branches having a metering orifice therein, spring-seated relief valves in said piping system maintaining the system completely filled with oil, strainer units in said system intervening between the main length thereof and the valves and orifices, and adapted to intercept and keep from the said valves and orifices, any scale from the pipe or any chip of metal introduced into the pipe in making the same up, means for intermittently measuring off a low volume charge of lubricant at the inlet and exerting an initial pressure on said lubricant of higher magnitude than that seating said relief valves, to effect prompt opening of the latter, the metering orifices offering a resistance to flow of magnitude such as to substantially sustain the pressure transmitted thereto from the source, whereby the pressure will rapidly build up in the system and the metering orifices will emit slowly until a charge equal to that forced into the pipe line has been emitted through the metering orifices.

21. An installation for supplying lubricant to a plurality of bearings from a single source, said installation comprising a pipe line connected to said source and having branches leading to the various bearings, each of said branches having a unit thereat across the path of lubricant flow, each of said units including a fixed metering orifice, a spring-seated relief valve and a strainer plug in the path of flow to said orifice and said valve, said plug intercepting any solid particles entrained with the oil, each of said units offering a resistance to lubricant flow substantially higher than that in the entire length of piping intervening between the source and the unit, the metering orifice of each of said units having a resistance to flow high compared to the combined resistance of the strainer plug and of the relief valve thereof, means for applying at the source, an initial pressure of higher order than that seating the relief valves, whereby the latter will be promptly opened, the resistance due to said units being such as to greatly retard the rate of propulsion due to the pressure at said source, whereby the entire length of the system will be maintained under a substantially uniform potential of pressure during the discharge of lubricant.

22. A chassis lubricating installation comprising a lubricant reservoir, a self discharged pump associated therewith, a pipe line connected to the outlet of said pump and having branches leading to the various chassis bearings, each of said branches having a terminal at the outlet end thereof, each terminal including a fixed metering orifice, a spring-seated relief valve and a strainer plug in the path of flow to said orifice and said valve to prevent settling thereat of any solid particles entrained with the oil, each of said units offering a resistance to lubricant flow substantially higher than that in the entire length of piping intervening between the source and the unit, the metering orifice of each of said units having a resistance to flow high compared to the combined resistance of the strainer plug and the relief valve thereof, said pump exerting an initial discharge pressure of higher order than that seating the relief valves, whereby the latter will be promptly opened by pressure transmitted thereto from the pump through the incompressible column of oil filling the pipe, and will remain in open position until the pre-measured charge of the pump has been forced into the pipe line and a corresponding charge concurrently ejected through the terminals.

23. An installation for lubricating in multiple a plurality of widely distributed bearings, said installation including a piping system having a single inlet and having outlet branches, said system including pre-assembled, self-contained metering fittings of diverse ratings mounted at the various bearings and supplied from said outlet branches, a source of lubricant pressure coupled in lubricant-tight relation at the inlet of the piping system, said piping system connecting said metering fittings in lubricant-tight pressure transmitting relation with each other throughout the period of emission of said fittings, each of said units comprising a metal part having a bore therein of fixed diameter having therein a pin of nearly the same diameter leaving a minute high resistance crevice controlling the exit therethrough, the rating of each unit depending on the diameter of the pin in the bore thereof, said system being constructed and arranged to substantially prevent leak therefrom in the intervals between applications of pressure from the source.

24. An installation for lubricating in multiple a plurality of widely distributed bearings, said installation including a piping system having an inlet and having outlet branches pre-assembled, self-contained, metering fittings mounted near the various bearings and supplied from said outlet branches, a spring-discharged pump coupled in lubricant-tight relation at the inlet of the piping system and exerting a discharge pressure in the order of 50 pounds per square inch, said piping system connecting said metering fittings in pressure transmitting relation with each other throughout the period of emission of said fittings, each of the fittings having a resistance to flow equivalent to that offered by a pin in the order of ½″ in length and 1/16″ in diameter within a corresponding bore in the fitting in the order of .001 to .007 inches larger in diameter than the pin.

25. An installation for lubricating in multiple a plurality of distributed bearings at different level, said installation including a piping system having an inlet and having outlet branches, pre-assembled, self-contained metering fittings mounted at the various bearings and supplied from said outlet branches, a source of lubricant pressure applied at the inlet of the piping system, said piping system connecting said metering fittings in lubricant-tight pressure-transmitting relation with each other throughout the period of emission of said fittings, each of said fittings comprising a metal part having a bore therein of fixed diameter nearly filled with a pin, leaving a minute high resistance crevice controlling the exit therethrough, the metering fittings having bores of uniform diameter, the pins having slight differences in diameter in accordance with the rate at which the different bearings are to be supplied with lubricant, all of said metering fittings in parallel offering a resistance to flow such as to substantially sustain the pressure transmitted from the source, said system being constructed and arranged to substantially prevent leak therefrom in the intervals between the applications of pressure at the source, 26. An installation for supplying lubricant in multiple to a plurality of bearings at different levels and comprising an intermittently operated pump of small volume, a pipe line supplied therefrom and having branches leading to said bearings, said branches having pre-assembled, self-contained terminal fittings applied at the relatively stationary elements of the several bearings, said fittings having identical longitudinal bores therein, the bore of each of said fittings nearly filled with a pin therein to leave a minute crevice, said pins of accurately predetermined diameter nearly filling said bores, the diameter of each pin being selected in accordance with the rate at which the corresponding branch is to deliver, the resistance to flow at each of the fittings including the fitting or fittings which deliver most freely, being high relative to the resistance of the most highly resistant length of pipe line between the pump and a fitting, said fittings being constructed and arranged to maintain said pipe line substantially filled with lubricant during the intervals between pump-operations.

27. A lubricating installation including a self-discharged pressure pump, piping connected thereto, means at various bearings connected in multiple to said piping and serving to restrict to extremely slow flow, delivery of the charge to the bearings under the working pressure and means to maintain the length of piping from the pump to each of the restricted means at all times completely filled with oil, whereby slow descent of the pump operating member is normal and a rapid advance thereof indicates an abnormal condition.

28. A lubricating installation, including a piping system, having an inlet, a plurality of widely distributed bearings supplied therefrom, a valve in advance of and adjacent each of said bearings open throughout discharge to the bearings and spring-seated in the intervals between operations to prevent flow of lubricant, and means for intermittently measuring off a small charge of lubricant and for injecting such charge through said inlet under an initial pressure of magnitude such as to promptly attain at each of said valves, a pressure greatly exceeding that seating the valve, whereby said valves will open substantially concurrently and resistant means associated with said valves governing the rate of injection into the pipe line and determining slow emission past said valves.

29. An installation for lubricating a plurality of distributed bearings, comprising a pipe line having branches extending to said bearings, a pipe fitting connecting each of said bearings to the associated branch, each of said fittings having therein a valve and a spring for maintaining said valve seated to prevent leak from the line, and restricting means in said fitting near said valve, said fittings of flow retarding effect such as to be in themselves substantially controlling compared with that due to the resistance in the pipe line and to govern the rate of admission to the system under an applied pressure several times that required to open the relief valves.

30. A chassis lubricating installation comprising a piping system along the chassis, having outlet branches leading to various bearings, terminals at said bearings through which said branches deliver, each of said terminals including a fitting having an accurately predetermined minute crevice of high flow resistance, each of said terminals also including a spring-seated relief valve at the outlet end thereof and a felt strainer plug at the inlet end thereof, an intermittently operable plunger pump of small volume at the inlet to the piping system, exerting a predetermined discharge pressure of higher order than that seating the relief valves, said terminal units substantially governing the rate of injection from the pump to the pipe line whereby the pressure due to said pump will build up promptly throughout the pipe system and the terminals will emit lubricant slowly to the bearings until the pump piston has settled to the end of its stroke.

31. In a lubricating installation, the combination of a lubricant inlet, a plurality of bearings, pipe lines connecting said inlet to said bearings, disk valves in advance of and adjacent each of the various bearings, each of said valves having a seating facing of material having the properties of oil-silk, of smoothness to seat completely under light pressure, softness to readily conform to the valve seat, substantially impervious, chemically inert to oil and non-sticking, relatively weak springs normally seating said valves, and means for applying at the inlet an initial pressure of magnitude such as to attain at each of said valves a pressure of higher order than that seating the valves, whereby said valves will open substantially concurrently.

32. In a chassis lubricating installation, the combination of a pipe line extending along the structure of the vehicle, having an inlet and provided with a plurality of outlets leading to various chassis bearings, means for applying pressure at said inlet, means at the various branches for controlling the division and discharge through the outlets, said means including relief valves provided with soft facings normally seated to prevent emission from said outlets during the intervals between pressure operations, absorbent strainers in advance of the various control means to intercept any solid particles that might otherwise be entrained with the lubricant and lodged at said control means, said absorbent strainers and the seating facings of said relief valves being of material that will withstand the baking temperature to which the completely assembled chassis are subjected for finishing in mass production.

33. A central lubricating installation comprising an intermittently operated pressure pump, a pipe line supplied therefrom and having branched outlets leading to the various bearings to be lubricated, said outlets having flow controlling fittings applied at the respective bearings, all of said fittings including valves of identical construction, said fittings calibrated for various fixed inadjustable discharges, each of said fittings having a distinctive mark representing its particular discharge, said valves spring seated between the operations to hinder loss of lubricant from the pipe line.

34. A central lubricating system including at the various bearings metering outlet fittings, each of said fittings emitting at a fixed predetermined slow rate when supplied with oil of a given viscosity under a given pressure, the various fittings having restrictions of different magnitude predetermined for diverse fixed ratings in accordance with the requirements of the corresponding bearings, a pipe line connecting said fittings, of bore so small as to prevent flow of lubricant about any air therein and of resistance to flow small compared to that of the fittings, and means for applying said given pressure to the pipe line, said fittings being constructed and arranged to prevent leak of oil from the path of transmission to said fittings when pressure is not applied, whereby the fittings will emit at their fixed and predetermined relative rates throughout the period of pressure application.

35. A central lubricating system including at the various bearings highly restricted metering outlet fittings, each of said fittings emitting at a fixed predetermined slow rate when supplied with oil of a given viscosity under a given pressure, the various fittings having restrictions of different magnitude predetermined for diverse fixed ratings in accordance with the requirements of the corresponding bearings, a common supply pipe line having outlet branches leading to said various fittings and of lower order of resistance to flow than said fittings, and means for intermittently applying and at each operation maintaining substantially said given pressure on the pipe line until a predetermined quantity of lubricant has entered the pipe line, said fittings being constructed and arranged to substantially prevent leak of oil therefrom during the intervals between pressure operations.

36. A central lubricating system including at the various bearings highly restricted metering outlet fittings, each of said fittings emitting at a fixed predetermined slow rate when supplied with oil of a given viscosity under a given pressure, the various fittings having restrictions of different magnitude predetermined for diverse fixed ratings in accordance with the requirements of the corresponding bearings, a common supply pipe, having outlet branches leading to said various fittings and of lower order of resistance to flow than said fittings and a pump connected to the supply pipe, said pump having an associated spring stressed for pump discharge from time to time, to force the pump contents into the supply pipe, the parts of said system being constructed and arranged so that substantially the full pressure generated at the pump is reached throughout the pipe line during pump discharge.

37. A central lubricating system including distributed metering outlet fittings presenting high resistance to flow and calibrated for various fixed inadjustable slow flow ratings when supplied with oil of a given viscosity under a given pressure, a common supply pipe line having outlet branches leading to said various fittings and means for injecting successive small charges of lubricant to the pipe line from time to time, under a pressure substantially equal to said given pressure, the parts of said system being constructed and arranged so that substantially the full pressure applied to the injected charge is reached throughout the pipe line during said injecting operation, whereby for each injection the pressure throughout said pipe line will build up rapidly to said given pressure, and said fittings will emit at their calibrated rates until the entire charge has been caused to enter the pipe line.

38. A central chassis lubricating system including highly restricted metering outlet fittings at the various bearings, each of said fittings emitting at a fixed predetermined slow rate when supplied with oil of a given viscosity under a given pressure, various fittings having restrictions of different magnitude predetermined for diverse fixed ratings, in accordance with the requirements of the corresponding bearings, a common supply pipe line of such small diameter as to be easily adapted to the irregularities of the chassis structure and to preclude the passage of lubricant around any air therein, and having branches leading to the metering outlets and of resistance to flow small compared to that of the fittings and a small volume intermittently operated pump for forcing oil under substantially said given pressure into said supply line, said fittings being constructed and arranged to substantially prevent leak of oil therefrom during the intervals between pump operations, whereby said fittings are caused to emit each at substantially its fixed predetermined rate, during pump discharge, there being little pressure loss in the pipe line intervening between the pump and the various outlet fittings.

39. A central lubricating system including at various bearings, metering outlet fittings presenting high resistance to flow and calibrated for various fixed inadjustable ratings when supplied with oil of a given viscosity under a given pressure, a common supply pipe line having outlet branches leading to said various fittings, a container of oil in communication with said pipe line, means for intermittently placing the contents of said container under substantially said predetermined pressure the elements of the system being constructed and arranged to substantially prevent leak of oil therefrom during the intervals between pressure applications, whereby substantially said pressure is supplied through the length of pipe line, thereby causing sustained slow emission of oil through said calibrated outlets at substantially the rates imposed by said fittings.

40. A centralized lubricating system including a pipe line having an inlet and a plurality of branches and valves at said branches normally seated to maintain the pipe line in advance thereof filled with lubricant, a pressure pump at the inlet to inject a charge of lubricant into the pipe line and to operate the valves under pressure transmitted from said pump through the intervening column of lubricant, said pump having a piston provided with an end structure to close the inlet to the pipe line and a spring retaining said structure in closing position during the intervals between pump operations.

41. A centralized lubricating system including a pipe line having an inlet at relatively high level and a plurality of branches each branch having a valve associated therewith normally spring seated to maintain the pipe line in advance thereof filled with lubricant, and a lubricant supply installation including an intermittently operated pump at the inlet to the pipe system, exerting pressure during discharge for operating said valves, said pump including a plunger provided with an end structure to close the inlet to the pipe line, and a coil spring encircling said plunger and retaining said end structure in closing position during the intervals between pump operations.

42. A chassis lubricating system including a lubricant supply installation, a pipe line supplied therefrom and having a plurality of branches leading to the bearings, flow controlling outlet fittings at said various branches, each including a resistance to flow, high compared to that in the length of the pipe line intervening between the supply installation and the bearing, each of said fittings including a spring-seated relief valve, said supply installation including a pump having a piston provided with an end structure to close the inlet to the pipe line and a spring retaining said end structure in closing position during the intervals between pump operations.

43. A chassis lubricating system including a lubricant supply installation at relatively high level, a pipe line supplied therefrom and having a plurality of branches leading to the various bearings, flow controlling outlet fittings at said various branches, each including a resistance to flow high compared to that in the length of pipe line intervening between the supply installation and the bearing, each of said fittings including a spring-seated relief valve, said supply installation including a reservoir and an associated pump, said pump having a spring propelled plunger normally urged to the end of its stroke and including a part closing the inlet to the pump and the outlet from the installation to the pipe line.

Signed at New York, in the county of New York and State of New York, this 23rd day of July, A. D. 1926.

JOSEPH BIJUR.

each branch having a valve associated therewith normally spring seated to maintain the pipe line in advance thereof filled with lubricant, and a lubricant supply installation including an intermittently operated pump at the inlet to the pipe system, exerting pressure during discharge for operating said valves, said pump including a plunger provided with an end structure to close the inlet to the pipe line, and a coil spring encircling said plunger and retaining said end structure in closing position during the intervals between pump operations.

42. A chassis lubricating system including a lubricant supply installation, a pipe line supplied therefrom and having a plurality of branches leading to the bearings, flow controlling outlet fittings at said various branches, each including a resistance to flow, high compared to that in the length of the pipe line intervening between the supply installation and the bearing, each of said fittings including a spring-seated relief valve, said supply installation including a pump having a piston provided with an end structure to close the inlet to the pipe line and a spring retaining said end structure in closing position during the intervals between pump operations.

43. A chassis lubricating system including a lubricant supply installation at relatively high level, a pipe line supplied therefrom and having a plurality of branches leading to the various bearings, flow controlling outlet fittings at said various branches, each including a resistance to flow high compared to that in the length of pipe line intervening between the supply installation and the bearing, each of said fittings including a spring-seated relief valve, said supply installation including a reservoir and an associated pump, said pump having a spring propelled plunger normally urged to the end of its stroke and including a part closing the inlet to the pump and the outlet from the installation to the pipe line.

Signed at New York, in the county of New York and State of New York, this 23rd day of July, A. D. 1926.

JOSEPH BIJUR.

CERTIFICATE OF CORRECTION.

Patent No. 1,632,771.                                  Granted June 14, 1927, to

JOSEPH BIJUR.

It is hereby certified that error appears in the printed specification of the above numbered patent requiring correction as follows: Page 9, line 118, for the word "is" read "its"; page 13, line 3, claim 11, for the word "ortifices" read "orifices"; page 15, line 89, end of claim 25, strike out the comma and insert a period; and that the said Letters Patent should be read with these corrections therein that the same may conform to the record of the case in the Patent Office.

Signed and sealed this 8th day of November, A. D. 1927.

Seal.

M. J. Moore,
Acting Commissioner of Patents.

CERTIFICATE OF CORRECTION.

Patent No. 1,632,771.  Granted June 14, 1927, to

JOSEPH BIJUR.

It is hereby certified that error appears in the printed specification of the above numbered patent requiring correction as follows: Page 9, line 118, for the word "is" read "its"; page 13, line 3, claim 11, for the word "ortifices" read "orifices"; page 15, line 89, end of claim 25, strike out the comma and insert a period; and that the said Letters Patent should be read with these corrections therein that the same may conform to the record of the case in the Patent Office.

Signed and sealed this 8th day of November, A. D. 1927.

Seal.

M. J. Moore,
Acting Commissioner of Patents.